Patented Nov. 26, 1946

2,411,599

UNITED STATES PATENT OFFICE 2,411,599

POLYMERIZATION PROCESS

William J. Sparks, Elizabeth, and Anthony H. Gleason, Westfield, N. J., assignors to Standard Oil Development Company, a corporation of Delaware No Drawing. Application November 9, 1940, Serial No. 365,014

5 Claims. (Cl. 204—162)

This invention relates to polymeric materials and relates particularly to heteropolymers or interpolymers of an unsaturated ester of the type of methyl acrylate with an iso-olefin of the type of isobutylene.

Among the more easily produced synthetic polymers are the polymers of methyl acrylate. These polymers are readily produced by heating the methyl acrylate monomer with a peroxide as a catalyst, or by exposure of the monomer to ultraviolet light. By these means it is possible to produce poly-methyl-acrylates which are hard, clear, transparent, thermoplastic resins. Also, isobutylene can be readily polymerized by a low temperature technique into poly-isobutylenes which range in character from a heavy oil to a rubber-like substance, according to the molecular weight. These polymers are produced by cooling the isobutylene to low temperatures, usually below −10° C. and preferably below −40° C., and thereafter treating them with a catalyst such as boron trifluoride. These two polymers are widely different in their physical characteristics, and it is very desirable to obtain materials having characteristics intermediate between those of the respective polymers. To the present, however, it had not been found possible to combine these two substances. The respective polymers are mutually incompatible to mixing at ordinary temperatures, since neither one dissolves in nor combines with the other. Also at the low temperatures required for the polymerization of isobutylene, the methyl acrylate is non-reactive, and at the normal room temperatures, the isobutylene is substantially nonreactive with boron trifluoride and like catalysts to produce a high molecular weight polymer.

The present invention provides a simple method for producing a heteropolymer of the iso-olefin with the ester by which a new and improved polymer is obtained. This new polymer is an interpolymer or heteropolymer of the ester and iso-olefin, characterized by greater toughness and strength than the poly-olefin, and much less brittleness than the poly-ester. Furthermore, the product is a clear, transparent, flexible, water white resin, having more or less elasticity according to the constituent substances. The process of the invention heteropolymerizes the unsaturated ester with the iso-olefin by a treatment (under pressure if necessary) at the reaction temperature by exposure of the mixture to ultraviolet light, or by treatment with peroxides, particularly organic peroxides such as benzoyl peroxide, or by the use of both ultraviolet light and peroxide catalysts.

Thus an object of the invention is to heteropolymerize together an unsaturated ester such as methyl acrylate with an iso-olefin such as isobutylene in the presence of a catalyst such as ultraviolet light or a peroxide, to produce a tough, flexible, strong, transparent, white resin. Other objects and details of the invention will be apparent from the following description.

In practicing the invention the ester and the iso-olefin are mixed in a container under such pressure as is required to keep the iso-olefin liquid at room temperature. A small quantity of an organic peroxide such as benzoyl peroxide may be also incorporated into the mixture, and the whole is allowed to stand in the presence of ultraviolet light for a substantial period of time to produce the desired interpolymer.

*Example I*

A mixture of 25 parts of monomeric methyl acrylate, having the formula

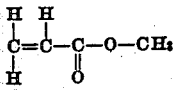

with 25 parts of liquid isobutylene, having the formula

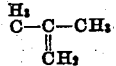

and 1 part of benzoyl peroxide was prepared in a glass container, under sufficient pressure to keep the isobutylene in the liquid state, and the container was sealed to maintain the pressure. The container with the included mixture was then exposed to light rays from a mercury vapor lamp for a period of approximately 50 hours. At the close of this period, a substantial stratification had occurred in the container, a portion being a solid polymer, the remainder being liquid isobutylene. The container was then opened, the excess isobutylene removed, and the solid polymer separated. The solid polymer was dissolved in benzol and reprecipitated from the benzol solution by the addition thereto of a substantial quantity of methyl alcohol. The precipitate was then dried for a substantial number of hours at temperatures between 90 and 100° C. under a vacuum of 27 inches. A proximate analysis of a sample of the polymer showed the following composition:

|  | Per cent |
| --- | --- |
| Carbon | 62.43 |
| Hydrogen | 8.70 |
| Oxygen (by difference) | 28.87 |

For isobutylene the corresponding values are:

|  | Per cent |
| --- | --- |
| Carbon | 85.7 |
| Hydrogen | 14.3 |

For this particular sample of methyl acrylate the corresponding values are:

|  | Per cent |
| --- | --- |
| Carbon | 54.4 |
| Hydrogen | 6.98 |
| Oxygen (by difference) | 38.62 |

Based upon the relative hydrogen values, the copolymer contains approximately 23.5% of isobutylene, and based upon the relative carbon values, the copolymer contains 25.5% isobutylene, the respective polymerizates then being present in the heteropolymer in the ratio of approximately 3 parts of methyl acrylate to 1 part of isobutylene.

The interpolymer as thus produced by the above polymerization procedure is a clear, tough, strong resin, completely insoluble in water or aqueous liquids, and strongly resistant to acids and alkalies. It is soluble in benzol and aromatic hydrocarbon liquids generally but insoluble in oxygenated organic solvents such as the alcohols, ethers, aldehydes, and organic acids.

The invention is not limited to the heteropolymerization of methyl acrylate with isobutylene, but may be applied to a considerable number of other acrylate type esters and iso-olefins.

*Example II*

A similar mixture of methyl acrylate was prepared with chloro ethyl vinyl ether, having the formula

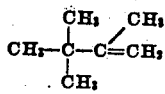

in approximately equal parts and treated with ultra-violet light for a similar period of time. This mixture likewise was found to interpolymerize to yield a clear resin, and a similar proximate analysis showed that the methyl acrylate and the ether interpolymerized in the ratio of approximately 3 molecules of methyl acrylate to 1 of the chloro ethyl vinyl ether. This product likewise is a tough, strong, flexible, clear, white resin.

*Example III*

The reaction similarly proceeds with methyl acrylate and tryptene, having the formula

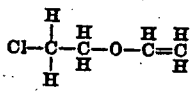

A similar mixture of methyl acrylate and tryptene was prepared as in Example I and treated for a similar time interval with ultraviolet light.

In this instance also a tough, flexible, strong, clear, white resin was obtained. A proximate analysis of this resin indicated that the methyl acrylate had interpolymerized with the tryptene in the proportion of approximately 7.3 parts of methyl acrylate to 1 part of tryptene (mole ratio 8.5:1).

*Example IV*

A similar reaction occurs with 2 methyl butene-1, having the formula

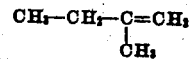

A mixture of approximately equal parts of methyl acrylate and the 2 methyl butene-1 was prepared as in Example I and treated over a similar prolonged period with ultraviolet light. In this instance also a tough, flexible, strong, clear resin was obtained on which approximate analysis showed the methyl acrylate to be present with the 2 methyl butene-1 in the proportion of 3 parts methyl acrylate to 1 part of the 2 methyl butene-1 (or a mole ratio of 5:2).

*Example V*

A similar heteropolymerization reaction occurs between methyl acrylate and dimethallyl, having the formula

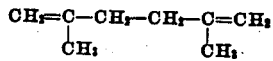

A mixture of approximately equal parts of methyl acrylate and dimethallyl were prepared as in Example I and treated under ultraviolet light for a similar time interval. A similar tough, flexible, strong, clear, white resin was obtained which was found to be insoluble in any available solvent including alcohols, ethers, esters and hydrocarbons as well as chlorinated hydrocarbons.

*Example VI*

Methyl acrylate and dimethallyl ether react similarly to the reaction in Example I and Example V. A mixture of approximately equal parts of methyl acrylate with dimethallyl ether, having the formula

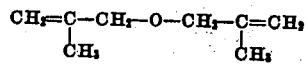

was prepared as in Example I and treated for a similar length of time with ultraviolet light. In this instance also a tough, elastic, strong, clear resin was obtained which also was found to be insoluble in any of the ordinary solvents.

*Example VII*

A similar reaction occurs between methyl acrylate and methallyl alcohol, having the formula

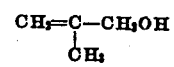

A mixture of methyl acrylate and methallyl alcohol in approximately equal proportions was prepared as in Example I and subjected to ultraviolet light for a prolonged time interval as in Example I to produce a similar tough, elastic, strong, clear, white resin in which a similar proximate analysis showed that the methyl acrylate was present in the proportion of 2 parts to 1 part of the methallyl alcohol (or mole ratio of about 3:2). This copolymer is readily soluble in the lower alcohols thus distinguishing it from the pure polyester of methyl acrylate.

Example VIII

A similar reaction occurs between methyl acrylate and methallyl acetal, having the formula

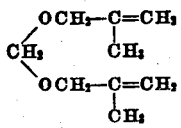

As in previous examples, a mixture of approximately equal parts of methyl acrylate and the second constituent, in this instance methallyl acetal, was prepared in approximately equal parts and treated with ultra-violet light as before. The reaction yielded a similar strong, flexible, clear, white resin which, however, was found to be insoluble in any of the usual solvents.

A similar experiment utilizing a mixture of methyl acrylate in approximately equal parts with 3 methyl butene-1, having the formula

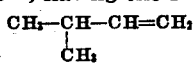

did not yield a polymerizate, indicating that the absence of the iso-olefinic structure prevented the occurrence of this reaction. Similarly as the size of the molecule increases, the ratio of interpolymerization decreases. This is well shown in the case of tryptene as above indicated, in which the high molecular weight of the tryptene resulted in a much lower proportion of hydrocarbon to methyl acrylate in the heteropolymer.

Similar experiments were conducted with dipentene and produced only negligible quantities of polymers, possibly because of the high molecular weight of the dipentene. Similar experiments were conducted with safrole, having the formula

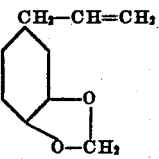

and with citronellal, having the formula

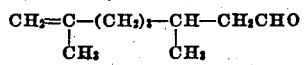

but in these instances also little or no interpolymer was obtained, apparently because of the high molecular weight of the substances or possibly because they do not contain the

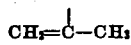

grouping.

When dimethallyl is one of the reacting components, both of the double bonds therein appear to react giving cross-linkages between chains and resulting in insolubility of the heteropolymer.

Similar copolymerizations may be effected with methyl methacrylate but the reaction is generally slower than that with the methyl acrylate, in spite of the supposed greater activity of the methacrylate. However, in this instance the polymerization by the use of a peroxide catalyst is generally satisfactory.

Example IX

A mixture of approximately equal parts of methyl methacrylate and methallyl alcohol was prepared with a small quantity of benzoyl peroxide and heated to a temperature of 85° C. for several hours. This reaction was found to yield a heteropolymer in which the methallyl alcohol and methyl methacrylate were present in an approximately 1 to 1 mole ratio as compared with the 3 to 2 ratio for methyl acrylate and methallyl alcohol under ultraviolet light.

Example X

Similarly methyl methacrylate and chloro ethyl vinyl ether react under ultraviolet light to form a copolymer similar to that obtained in Example II containing approximately 3 percent of chlorine, in which there appear to be approximately 11 molecular parts of the ester with 1 molecular part of the ether. Other tests show that the methyl methacrylate reacts in generally the same manner to produce similar heteropolymers as in the case of the simple methyl acrylate. However, the reaction under the influence of ultraviolet light is noticeably slower, but it is generally more satisfactory in the presence of peroxide catalysts at elevated temperatures.

These resins, being thermo-plastic, are particularly well adapted for the preparation of molding compositions by themselves or in combination with a wide range of fillers, such as the inert pigments including ferric oxide, carbon black, chrome green, zinc oxide, lithopone, barytes and the like, as well as the various organic fillers including paper, cloth, wood flour, cellulose fibers generally and the like, either with or without the various dyes which may be applied to the various pigments, or with the various oil soluble dyes which are soluble in the present resins. Similarly, being clear, white resins, these materials are useful for transparent molding compositions including lenses, various items of tableware and decorative articles either in the clear, white of the pure resin or the clear colors produced by dyes or the opaque colors produced by fillers with or without pigments, lakes or dyes. The resins are good bases for paints, enamels, varnishes, etc.; are good electrical insulators and are useful for molded insulators either with or without insulating material fillers, and are particularly useful as replacement material for uses where physical properties of the type processed by leather are desired, since they are sufficiently flexible and elastic to serve as leather substitutes, and in some instances as replacement for rubber where less elasticity than is characteristic of rubber, even when rubber is heavily loaded with pigment fillers, is desirable.

By the process of the invention there are thus obtained a series of new and useful heteropolymers in the form of resins of high strength, high toughness, flexibility, low brittleness, low solubility in solvents generally and a clear, transparent character which are particularly useful for lacquers, adhesives, molded articles and the like.

While there are above disclosed but a limited number of embodiments of the invention, it is possible to produce still other embodiments without departing from the inventive concept herein disclosed, and it is therefore desired that only such limitations be embodied upon the appended claims as are stated therein or required by the prior art.

The invention claimed is:

1. The polymerization process comprising the steps in combination of mixing a methylacrylate and an alpha olefin in liquid form at room temperature and interpolymerizing the mixture by the application thereto of ultra violet light to yield a high molecular weight, solid interpolymer of a methyl acrylate and an alpha olefin.

2. The polymerization process comprising the steps in combination of mixing a methylacrylate, an alpha olefin, and an organic peroxide in liquid form at room temperature and interpolymerizing the mixture by the application thereto of ultra violet light to yield a high molecular weight, solid interpolymer of a methyl acrylate and an alpha olefin.

3. The polymerization process comprising the steps of mixing methylacrylate and isobutylene in liquid form under pressure at room temperature and polymerizing the mixture by the application thereto of ultra violet light to yield a high molecular weight, solid interpolymer of a methacrylate and isobutylene.

4. The polymerization process comprising the steps of mixing methylacrylate and chlorethyl phenyl ether in liquid form under pressure at room temperature and polymerizing the mixture by the application thereto of ultra violet light to yield a high molecular weight, solid interpolymer of a methacrylate and a chlor ethyl phenyl ether.

5. The polymerization process comprising the steps of mixing methylacrylate and dimethallyl in liquid form under pressure at room temperature and polymerizing the mixture by the application thereto of ultra violet light to yield a high molecular weight, solid copolymer of a methacrylate and dimethallyl.

WILLIAM J. SPARKS.
ANTHONY H. GLEASON.